United States Patent
Kalisch et al.

(10) Patent No.: US 7,744,139 B1
(45) Date of Patent: Jun. 29, 2010

(54) METHOD FOR SEIZING ROWS OF BAG PACKINGS (POUCHES)

(75) Inventors: Peter Kalisch, Bremen (DE); Wolfgang Schutz, Rethem/Moor (DE); Meinhard Protz, Bomlitz (DE)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/937,952

(22) PCT Filed: May 17, 2000

(86) PCT No.: PCT/DE00/01604

§ 371 (c)(1),
(2), (4) Date: Dec. 10, 2001

(87) PCT Pub. No.: WO00/69723

PCT Pub. Date: Nov. 23, 2000

(30) Foreign Application Priority Data

May 18, 1999 (DE) ................... 199 22 676

(51) Int. Cl.
*B66C 1/42* (2006.01)
*B65B 35/36* (2006.01)

(52) U.S. Cl. .................... 294/87.1; 294/87.26

(58) Field of Classification Search ............... 294/27.1, 294/81.1, 81.5, 65, 81.6, 81.62, 87.26, 87.28, 294/87.24, 87.22, 119.1, 87.1; 53/396, 469, 53/247; 383/5, 6, 15, 78

See application file for complete search history.

(56) References Cited

U.S. PATENT DOCUMENTS

| | | | | |
|---|---|---|---|---|
| 885,580 A * | 4/1908 | Breckenridge | ............... | 294/15 |
| 898,584 A * | 9/1908 | Bau | ............... | 294/15 |
| 1,252,226 A * | 1/1918 | Plotka | ............... | 294/87.1 |
| 1,350,984 A * | 8/1920 | Sitkiewitz | ............... | 294/87.1 |
| 2,532,604 A * | 12/1950 | Carski | ............... | 211/74 |
| 2,623,775 A * | 12/1952 | Gamet et al. | ............... | 294/67.2 |
| 3,473,725 A | 10/1969 | Wiehahn | | |
| 3,655,180 A * | 4/1972 | Holler | ............... | 53/542 |
| 3,822,528 A | 7/1974 | Carlson et al. | | |
| 3,954,165 A * | 5/1976 | Snyder | ............... | 53/152 |
| 4,119,217 A * | 10/1978 | Jones | ............... | 414/788.6 |
| 4,398,383 A * | 8/1983 | Prakken | ............... | 53/537 |
| 4,399,905 A * | 8/1983 | Lance et al. | ............... | 198/430 |

(Continued)

FOREIGN PATENT DOCUMENTS

DE 369991 * 2/1943

(Continued)

*Primary Examiner*—Paul T Chin
(74) *Attorney, Agent, or Firm*—Frommer Lawrence & Haug LLP; Matthew K. Ryan; Jon Gordon

(57) ABSTRACT

A method for picking up and handling filled, closed rectangular bags, film packs and pouches, which have a bottom side, and two longitudinal sides, and are provided on the bottom side with a bottom fold. The pouches, standing on one of the longitudinal sides, are arranged in parallel to one another in a row and in each case are picked up with a gripper mechanism having comb-like, finger-like gripper elements on an opposite (upper) longitudinal side with the gripper elements being moved between the upper longitudinal sides of adjacent pouches. The gripper elements are moved in the longitudinal direction of the upper longitudinal sides, from the base side and pass the same, between adjacent longitudinal sides.

6 Claims, 2 Drawing Sheets

U.S. PATENT DOCUMENTS

| | | | |
|---|---|---|---|
| 4,581,874 A | * | 4/1986 | Rechtsteiner et al. .......... 53/425 |
| 4,583,352 A | * | 4/1986 | Heron ......................... 156/494 |
| 4,768,642 A | * | 9/1988 | Hunter .................... 198/419.2 |
| 4,886,674 A | | 12/1989 | Seward et al. |
| 5,176,244 A | * | 1/1993 | Radzins et al. .............. 198/430 |
| 5,315,807 A | * | 5/1994 | Restle et al. .................. 53/455 |
| 5,330,269 A | | 7/1994 | Kamada et al. |
| 5,655,842 A | | 8/1997 | Hagino |
| 5,768,856 A | * | 6/1998 | Odenthal ..................... 53/247 |
| 5,860,270 A | * | 1/1999 | Gerwe ......................... 53/477 |
| 6,490,846 B2 | * | 12/2002 | Koppe ......................... 53/459 |

FOREIGN PATENT DOCUMENTS

| | | | |
|---|---|---|---|
| EP | 1043233 | * | 11/2000 |
| JP | 2000281004 | * | 10/2000 |

* cited by examiner

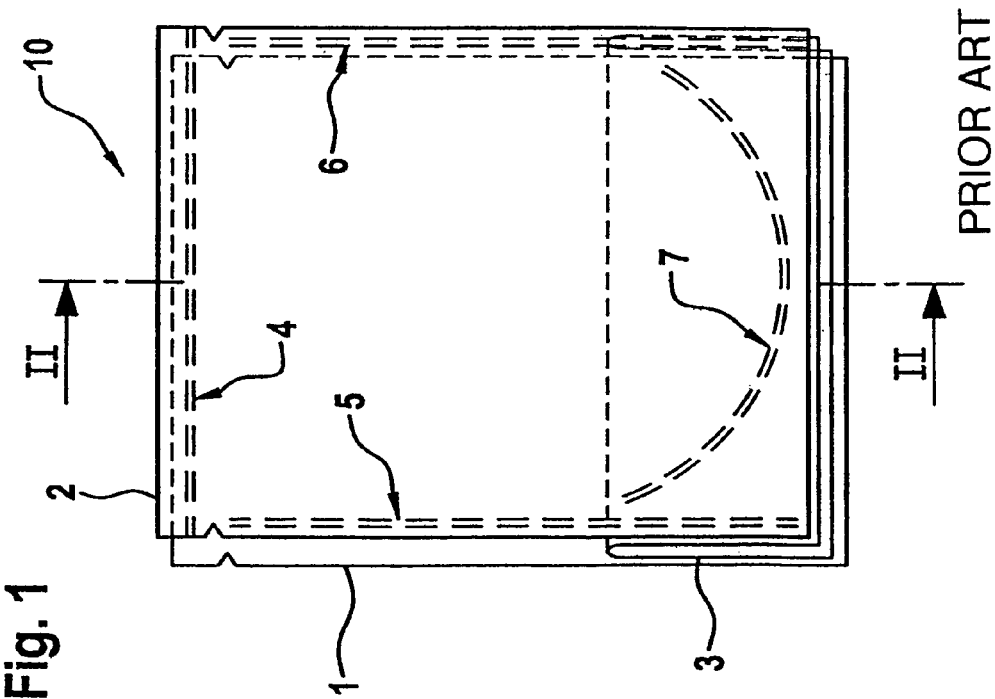
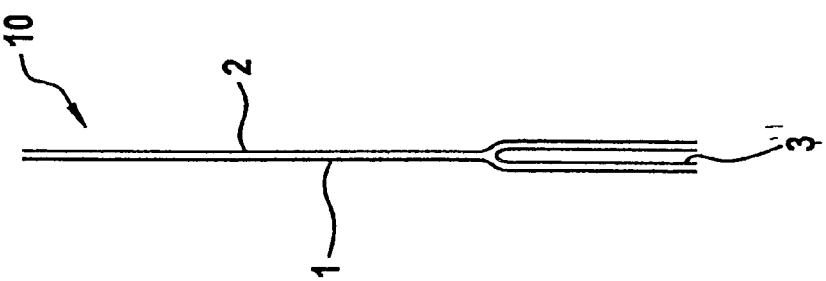
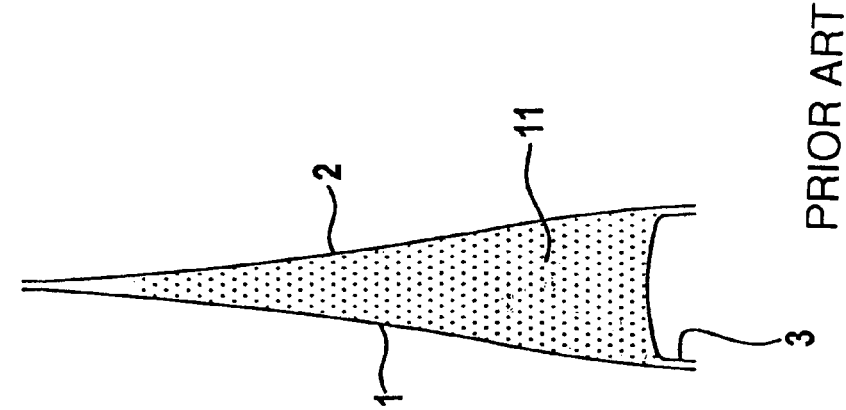

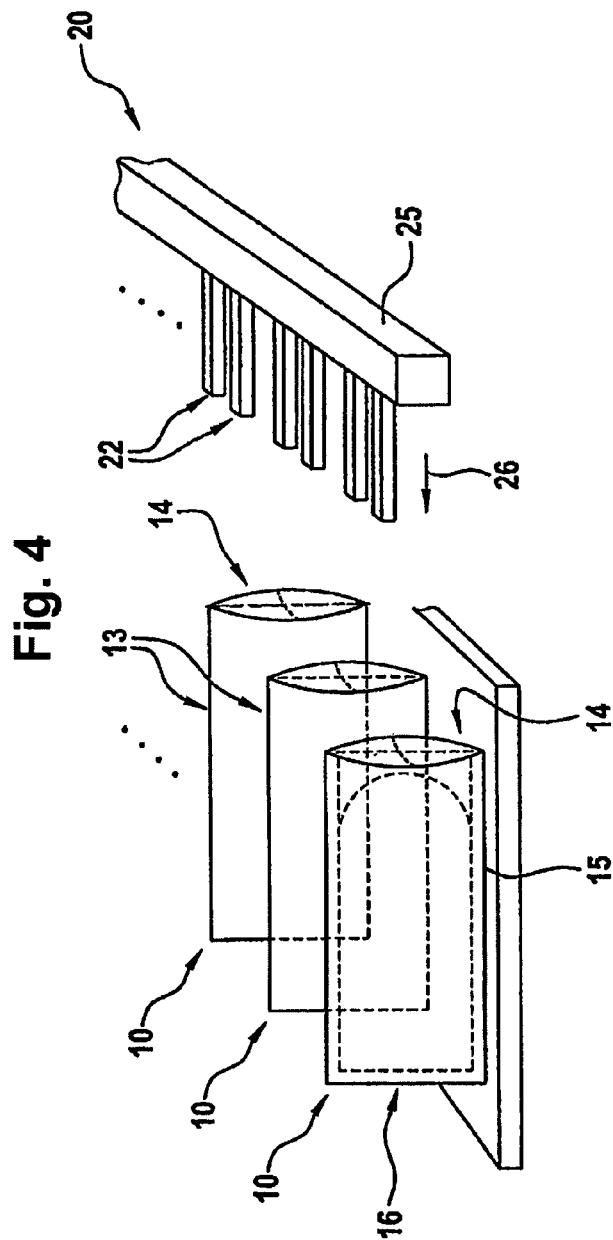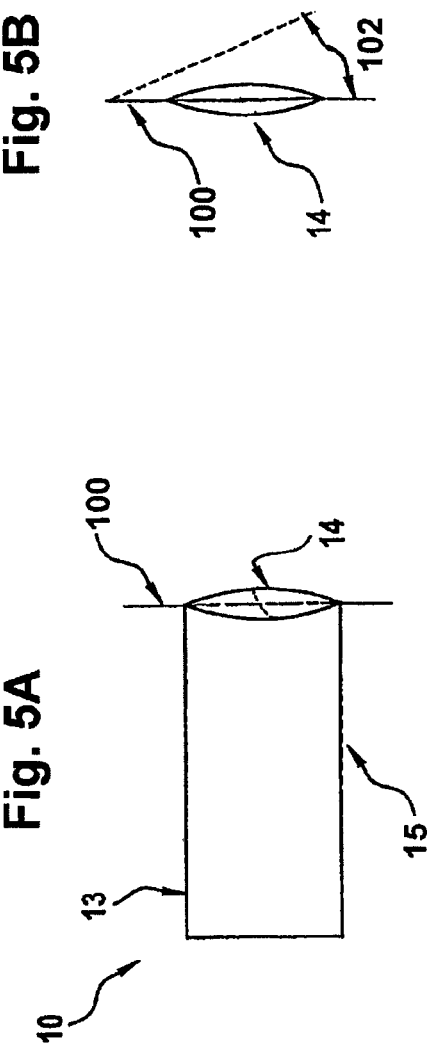

METHOD FOR SEIZING ROWS OF BAG PACKINGS (POUCHES)

BACKGROUND OF THE INVENTION

This invention relates to a method for picking up and handling filled and sealed, rectangular bags or film packs, also known as pouches, which have a bottom side provided with a bottom fold and two longitudinal sides. In the sense of the present invention the term "handling" relates to any random conveying, supplying, transferring, sorting, intermediate storing, etc.

The invention is in the field of the manufacture and further processing of pouches filled with (animal foods. The previously manufactured tubular pouches are filled in special filling and sealing mechanisms with an ingredient or component and are then closed and sealed and subsequently usually undergo a sterilization before the finished products are packed.

Since it has proved advantageous for various reasons for the pouches to stand during sterilization on one of the longer lateral edges or longitudinal sides, i.e., with a main extension plane containing the pouch lateral edges being substantially vertical and the longer lateral edges substantially horizontal, the problem arises of simultaneously reliably mechanically gripping or picking up a plurality of parallel pouches arranged in a row, in order to hold the pouches or perform a handling movement therewith.

BRIEF SUMMARY OF THE INVENTION

The invention solves this problem by a method for picking up and handling filled and sealed, rectangular pouches, which have a bottom side and two longitudinal sides and are provided on the bottom side with a bottom fold. The pouches, standing on one of the longitudinal sides are arranged in parallel and in a row and are in each case picked up on an opposite (upper) longitudinal side with a gripper mechanism having comb-like, finger-like gripper elements. The gripper elements are movable between the upper longitudinal sides of adjacent pouches. The gripper elements are moved in the longitudinal direction of the upper longitudinal sides from the bottom side and pass the latter between adjacent longitudinal sides.

Through the combination of two essential measures, namely the arrangement of the pouches standing or lying on one longitudinal side and the introduction or "threading" movement of the gripper mechanism taking place from the side, a much more reliable picking up of the bag edge occurs than in the case of a picking up movement from above, even if, as a result of a preceding heat treatment, the bag edge may be slightly folded around or bent down.

It is possible to simultaneously grip a row of 5 to 100 or more pouches. The spacing between adjacent pouches in a row can be less than the thickness of a single pouch, i.e., the pouches can be juxtaposed virtually with no gap.

It is appropriate for the pouches to be gripped in clamping manner, i.e., for the gripper mechanism to have for each pouch to be picked up a pair of gripper jaws, where at least one is movable or has a movable element or between which a longitudinal side of a pouch can be gripped in clamping manner. Alternatively, the longitudinal sides of the pouches can be engaged by vacuum.

Preferably, the pouches are gripped in an orientation in which a main extension plane containing the lateral edges of the pouches is inclined to the vertical by an angle of less than 60°. The main extension plane is preferably arranged in a substantially vertical manner. Appropriately, the longitudinal side on which each pouch stands is horizontally oriented.

BRIEF DESCRIPTION OF THE DRAWINGS

The invention is described in greater detail hereinafter relative to an embodiment and with reference to the attached drawings, wherein:

FIG. 1 is a diagrammatic, perspective view of the essential components of a known pouch with bottom fold.

FIG. 2 is a cross-sectional view of a pouch according to FIG. 1 in the collapsed state.

FIG. 3 is a cross-sectional view of a filled, sealed pouch according to FIG. 1.

FIG. 4 is a highly diagrammatic, perspective view of a device for picking up a row of pouches.

FIG. 5A is a perspective view of a filled, sealed pouch according to FIG. 1.

FIG. 5B is a bottom side view of a filled, sealed pouch according to FIG. 1.

DETAILED DESCRIPTION OF THE INVENTION

With initial reference to FIG. 1, the construction of a known pouch, e.g., for animal foods will be explained. The pouch 10 essentially comprises two lateral films 1, 2 with a rectangular base shape and which receive between them in their lower or bottom area a U-shaped folded bottom film 3. An upper sealing seam 4, lateral sealing seams 5 and 6, as well as two bottom sealing seams 7 are used for forming a closed pouch interior and a reinforced bottom section, which apart from an increased pouch capacity has the advantage that the pouch is stable in the filled state.

FIGS. 2 and 3 illustrate the cross-sectional shape of an empty pouch and one filled with a product 11.

During the manufacturing process of completely filled and sterilized pouches they must generally be introduced into, and removed from, suitable carrier mechanisms. For the extensive automation of the manufacturing process use is made for the removal of all the pouches in a carrier mechanism of a gripper mechanism. The carrier mechanism has a plurality of juxtaposed gripper elements, whose number corresponds to that of the pouches to be picked up and whose reciprocal spacing also coincides with the given spacing of the pouches in the carrier mechanism.

FIG. 4 diagrammatically shows such a comb-like gripper mechanism 20, which has a row of finger-like gripper elements 22. As shown in FIG. 4, for each of the pouches 10 held in a carrier mechanism (not shown in a detailed manner) there is a pair of gripper elements 22, which are appropriately fitted to a gripper carrier 25. The gripper elements 22 (or in each case one pair) are movable in the direction of arrows 28 and may be operated by compressed air. Alternatively in one or two gripper elements of a pair is an extensible piston or some other clamping element is provided to grasp the lateral edge of a pouch to be picked up in a claiming manner. This is shown in FIG. 5 where extensible pistons 30 move in the direction of arrows 32.

According to the invention, the gripper mechanism 20 is moved in the direction of the arrow 26 in a linear manner to the pouches 10. The gripper elements 22 are level with the upper lateral edges or longitudinal sides 13 of the pouches 10. According to the invention, the pouches 10 for the picking up or "threading" movement of the gripper mechanism 20 are arranged so that the bottom sides 14 of the pouches are directed towards the gripper mechanism 20. From the bottom side, the gripper elements 22 initially move past the corner (pointing to the top right in FIG. 4) between the bottom side 14 and longitudinal side 13 and then over or alongside the upwardly standing longitudinal sides 13, so that an adequate part of the longitudinal side 13 can be engaged. The tendency of the bottom side 14 or longitudinal side 13 in the vicinity of the bottom side 14 to fold round is much less than on a pouch top side 16 opposite to the bottom side 14. Thus a much more reliable gripping of the longitudinal side 13 is achieved, even if the latter is zonally bent or folded round, as compared with a movement of the gripper mechanism 20, where it is lowered from above or is "threaded" from the side 1 opposite to the bottom side 14.

As depicted in FIGS. 5A and 5B, the pouches 10 are preferably gripped in an orientation in which the main extension plane 100 containing the lateral edges or longitudinal sides 13 and 15 of the pouches 10 is inclined to the vertical by an angle 102 of less than 60°. The main extension plane 100 is preferably arranged in a substantially vertical manner. Appropriately, the lateral edge or longitudinal side 15 on which each pouch stands is horizontally oriented.

What is claimed is:

1. A method for picking up and handling filled, sealed, rectangular pouches, each pouch comprising two lateral films with a U-shaped folded bottom film between the lateral films, the pouches arranged in parallel in a row and standing on one of two longitudinal sides, and having a facing upper longitudinal side, the method comprising:

picking up the pouches with a gripper mechanism having finger-like gripper elements that are substantially mutually parallel and project substantially perpendicularly from a gripper carrier;

wherein the gripper elements are moved in a parallel path between adjacent upper longitudinal sides of adjacent pouches, in a longitudinal direction of the upper longitudinal sides, from the bottom side of the pouches; and wherein picking up each pouch comprises gripping the upper longitudinal side of the pouch between gripper elements, at least one of which is movable or comprises a movable element.

2. A method according to claim 1, wherein a row of 5 to 100 pouches is simultaneously gripped.

3. A method according to claim 1, wherein said movable element is an extendable piston enabling a longitudinal side of a pouch to be picked up in clamping manner.

4. A method according to claim 3, wherein the main extension plane of each pouch to be gripped is substantially vertical.

5. A method according to claim 1, wherein a main extension plane may be identified for each pouch, which plane substantially contains all the lateral edges of the respective pouch, and where the pouches are gripped in an orientation in which the main extension plane of each pouch is inclined to the vertical by an angle of less than 60°.

6. A method according to claim 1 wherein the longitudinal side on which each pouch stands has a horizontal orientation.

* * * * *